United States Patent [19]
Potter

[11] 3,916,022
[45] Oct. 28, 1975

[54] METHOD FOR DECURLING PHOTOGRAPHIC FILM

[76] Inventor: Elvin W. Potter, 4913 Pike Drive, Metairie, La. 70003

[22] Filed: Apr. 30, 1973

[21] Appl. No.: 355,769

[52] U.S. Cl. ............... 264/22; 264/280; 264/285; 264/322; 162/197
[51] Int. Cl.² ............................................ B29D 7/14
[58] Field of Search .......... 264/285, 280, 320, 322, 264/22; 162/270, 271, 197

[56] References Cited
UNITED STATES PATENTS

| | | | |
|---|---|---|---|
| 2,012,953 | 9/1935 | Brunner | 162/271 |
| 2,574,588 | 11/1951 | Piperoux | 264/280 X |
| 2,852,412 | 9/1958 | Hassel | 264/320 X |
| 2,893,053 | 7/1959 | Powell | 162/270 X |
| 2,901,811 | 9/1959 | Hall | 264/322 |

*Primary Examiner*—Richard R. Kucia
*Attorney, Agent, or Firm*—Pugh & Laiche

[57] ABSTRACT

The present invention provides a method for removing the curl from a thermoplastic photographic film whereby it is made physically flat. The present invention is primarily concerned with controlling the curl of that form of microfilm known as microfiche which is described in the trade as a new form of microfilm in which a related group of images are arranged on a card shaped transparent sheet of film, generally measuring 4 × 6 inches and handled in an unmounted state. The present method comprises first heating the thermoplastic photographic film, passing the heated film over a cooled mandrel positioned on the side of the film opposite the direction of curl, and concomitantly cooling the film as it is pressed upon the mandrel.

8 Claims, 4 Drawing Figures

METHOD FOR DECURLING PHOTOGRAPHIC FILM

BACKGROUND OF THE INVENTION

The present invention pertains to the photographic arts, and is primarily concerned with the problem of removing curl from a photographic film. More specifically, the present invention is primarily applicable to the removal of curl from a heat-developable thermoplastic photographic film, especially a vesicular photographic film.

The physical flatness of any given photographic film will naturally depend upon numerous parameters, e.g. the forces imposed upon it during its manufacture, that is, exposure, development, and clearing; the method of finishing; and its subsequent storage. If the photographic film is rolled on a spool or mandrel, the additional problem of the curl resulting from the roll form is introduced. Needless to say, some of these parameters will vary depending upon their physical and chemical explanation. Perhaps the most noticeable changes occur in a conventional photographic film due to temperature and humidity conditions. As is known in the art, sensitized photographic film usually comprises several layers of materials whose dimensional response to moisture differs. The resulting differential stresses of the layers making up the film will therefore tend to cause the film to assume generally other than a flat condition. Moreover, these stresses and the resulting curl will change from time to time corresponding to temperature and humidity conditions.

Curl in a photographic film can occur in either the machine direction which is referenced to the curvature about an axis parallel to the machine direction of the coating, or both for that matter. The particular curl value of a film is expressed as the numerical equivalent of 100 divided by R where R is the radius of the curvature in inches. When a photographic film curls toward the sensitized emulsion side, the curl measurement is given a positive value. On the other hand, when the curl is toward the backside, the measurement is given a negative value. Needless to say, various films will exhibit characteristic degrees of curl which will occur in typical directions, that is, whether it be machine or cross direction or whether it be positive or negative curl. For example, by the above standards, conventional photographic film in roll form may be expected to have a curl value of ± 150, aerial film +200, sheet film + 15 or less, and so on. Thus, the significance of a given film curl value depends entirely upon the photographic application and the conditions of use.

While the present method and means can be employed to decurl any form of thermoplastic film, it is primarily concerned with controlling the curl of that form of microfilm known as microfiche, especially vesicular microfiche. Microfiche is described in the trade as a new form of microfilm in which a related group of images are arranged on a card shaped transparent sheet of film. Such sheets of film generally measure 4 × 6 inches and are handled unmounted. Consequently, curl in such a product makes it difficult to line up a master to be copied with the copy film. Additionally, any appreciable amount of curl, for most applications a curl value of not greater than three and quite often not greater than one, is considered objectionable. Other problems with curled film resides in its difficulty to subsequently stack, file, and handle, e.g. in machines such as readers, etc. It is a common practice in the trade for operators handling curled film to attempt to mechanically decurl the film by passing it over the edge of a sharp object, such as can be accomplished with a piece of paper. Needless to say, such a practice will scratch the film which damage becomes serious in the case of microfilm. Additionally, attempts have been made to decurl the film by stacking it under pressure, etc.

These and other problems of the prior art are readily overcome by the present invention which provides both a method and means for decurling thermoplastic photographic film in a manner whereby the film is not scratched or damaged whatsoever. Further advantages and features of the instant invention will become apparent as the discussion proceeds.

DESCRIPTION OF THE PREFERRED EMBODIMENT

Figure 1:
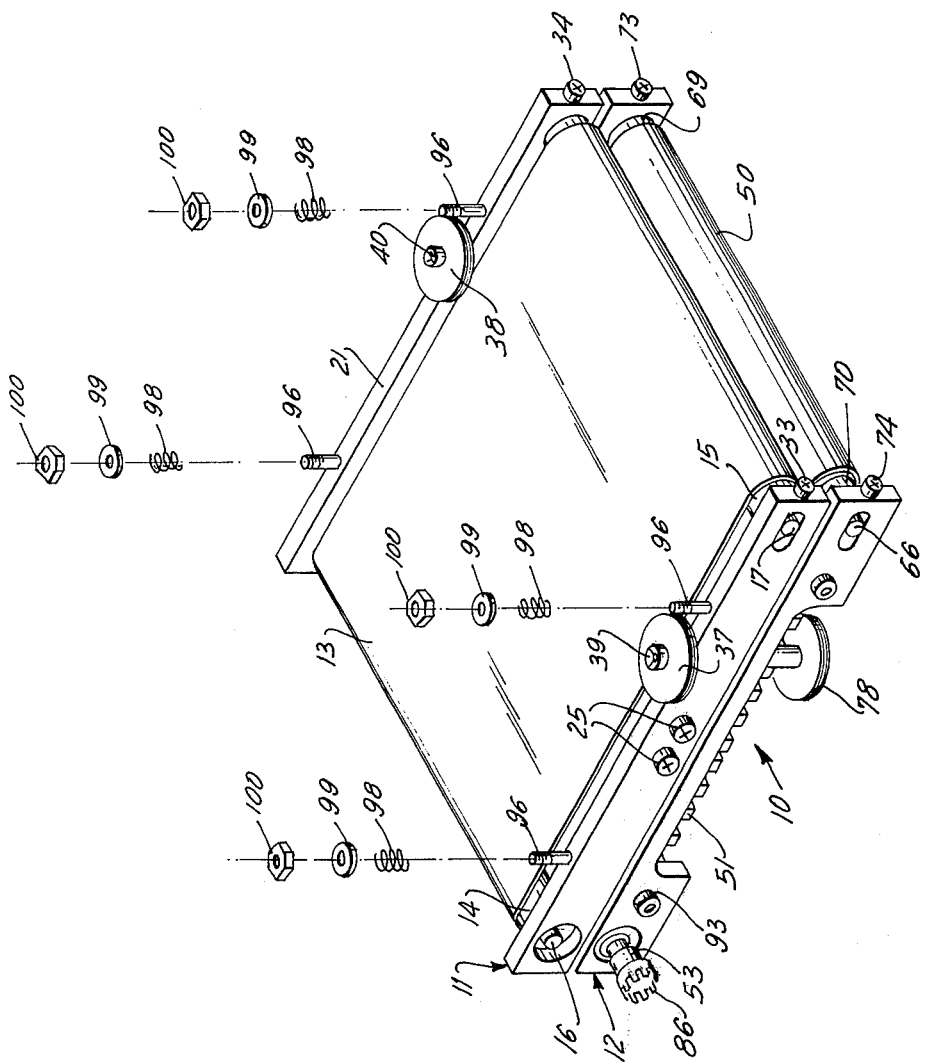
FIG. 1 represents an isolated isometric view of the basic components of the present invention.

As brought out above, the present method and means is preferred for decurling that form of microfilm known as microfiche, especially vesicular microfiche and for that reason, will be described below with particular reference thereto. Additionally, it is preferred to employ the present device as a component of a vesicular film duplicator, that is, a device capable of receiving a master and reproduce it on vesicular copy film. Such an apparatus would comprise an exposure station where the master to be copied and the vesicular copy film are oriented in juxtaposition. The vesicular film is then exposed by exposure to a source of high intensity energy capable of decomposing the sensitized gas producing compound in the vesicular film. The master and the exposed vesicular copy are then physically separated and the exposed vesicular film is transported by suitable conveying means from the exposure station to a development station. The development station can comprise a heated roller and belt assembly capable of relaxing the plastic vehicle in which the sensitized compound is embedded whereby vesicles are formed in those areas of the film emulsion which has been exposed to the high energy source thereby creating vesicles in the exposed area in the film which in turn corresponds to the image of the master copy.

The present device would necessarily be positioned downstream of the development station for decurling the vesicular microfilm copy. With regard to decurling photographic copy film by decurling it means not only the removal of curl that is present in the raw stock copy film, but additionally, and quite often more particularly, the removal of curl which inherently develops in a vesicular film which occurs due to the conventional thermal development of such films whereby curl will quite often occur regardless of whether or not initial curl is present. In essence, the present decurling means constitutes a chill station comprising a belt roller and a heat sink which absorbs the heat from the copy fiche exiting from the developer station in the case of vesicular microfiche. The fiche is usually developed at a temperature of approximately 260°F, depending mostly upon such parameters as film type and base thickness, in the developer station, and thereafter is peferably reduced to a temperature below 140°F before entering a clearing station. The present decurling device or chill station provides this cooling interface between the developer and the clearing station, as well as serving to decurl the film. While the present device is described in particular to its adaptation in a duplicator apparatus for use with vesicular microfiche, it will be apparent to one skilled in the art that the present device can be mounted in a separate housing and utilized separately to decurl any type of thermoplastic film, that is, whether it be silver halide, diazo, vesicular, or the like. When employed as a separate unit, it is preferred to include some form of suitable heating means, such as the developing station described supra, positioned in an operable relationship to the present decurling means and positioned upstream thereof whereby an operator wishing to decurl a given piece of thermoplastic film, could readily perform the heating & decurling thereof in a single piece of equipment.

Referring to FIG. 1 in the drawings, the present decurling device or chill station assembly 10 comprises the top plate 11 and bottom plate 12 assemblies. The top plate assembly 11, as shown in greater detail in the drawings in FIG. 2, in essence, constitutes an idler belt stretched between two idler rollers. Specifically, the belt 13 is an endless pliable belt mounted upon and stretched between the rollers 14 and 15. The roller 14 is further defined as including the shaft 16. The roller 14 preferably comprises a hard rubber member bored to receive the metal shaft 16. The extended end portions of the shaft 16 of the roller 14 are adapted to slidably and rotably fit within the bushing or bearing members 18 and 19 which in turn are adapted for mounting in the supporting side plate members 20 & 21. The latter are bored to receive the respective bearings 18 and 19, interference between the members being such that the bearings 18 and 19 will not rotate within the respective bore holes 22 and 23 in the support plates 20 and 21. The side plates 20 and 21 are mounted in a fixed spaced apart relationship by virtue of the brace member 24 which is rigidly connected to the side plates 20 and 21 by virtue of the respective pair of screws 25 and 26.

The front roller 15 comprises a cylindrical hollow tubular member which is adapted at each of its ends to snugly receive the bearing members 27 and 28, the latter in turn being bored to receive and rotate upon the shaft 17. The bearing or bushing members 27 and 28 includes an extended portion which bayonets within each respective open end of the hollow roller 15 such that the shaft 17 is concentrically mounted within and upon which the roller assembly 15 rotates.

The side plates 20 and 21 are provided with the elongated holes or slots 29 and 30 of a thickness sufficient to admit the ends of the shaft 17 whereby the latter can be laterally shifted within the elongated slots 29 and 30 over a distance sufficient to remove slack from the pliable belt 13, or conversally, to place it under tension. This is accomplished by virtue of the shaft 17 being provided with the bored holes 31 and 32 such that upon rotation of the respective screws 33 and 34 which, as shown in FIG. 1, when extended through the holes 35 and 36 provided in the end of the respective side plates 20 and 21 in open communication with the slots 29 and 30, and fitted in the respective threaded holes 31 and 32 of the shaft 17, serve as a means of adjusting the lateral position of the shaft 17, or roller assembly 15, relative to the opposing roller 14. In such fashion, the tension in the rubber or similar pliable material belt 13 can be readily adjusted.

The belt 13 is constantly centered on the rollers 14 and 15 by virtue of the idler disc 37 and 38, as specifically shown in FIG. 1 of the drawings. The idler disc 37 and 38 are mounted upon the respective side support members 20 and 21 which are threadably bored to receive the respective screws 39 and 40. The idler disc 37 and 38 are also bored to receive the screws 39 and 40. The spacer members 41 and 42 are provided for positioning the respective idler disc 37 and 38 at a fixed spaced apart relationship from its respective side support plate depending upon the position of the belt edge as a factor of the overall dimensions of the roller diameters and width of the side support plate.

The bottom plate assembly 12 is similar in most respects to the top plate assembly 11 except for the fact that the belt member 50 is the driven belt and that the mandrel 51 is provided, being positioned within the interior of the belt. The roller 52 is similar to the roller 14, being provided with the shaft 53 and also preferably being of a soft resilient material to provide frictional contact between the inside surface of the belt 50 and the peripheral surface of the roller 52. The bearings 55 and 56 are bored to receive the respective end portions of the shaft 53 of the roller 52. Likewise, the bottom side support plates 57 and 58 are provided with the bore holes 50 and 60 in which the respective bearings 55 and 56 are snugly fitted to prevent their rotation within.

The side support plates 57 and 58 are held apart in a fixed spaced apart relationship by virtue of the runners or braces 60 and 61, the latter being attached to the side support plates 57 and 58, at each of their ends, by virtue of the screw pairs 60 and 64, the members 60 and 61, as well as the side support plates 57 and 58, being bored to receive the recited screws. The opposite ends of the braces 60 and 61 which are hidden beneath the chill belt 50 are similarly fastened to the side support plate 58.

Figure 2:
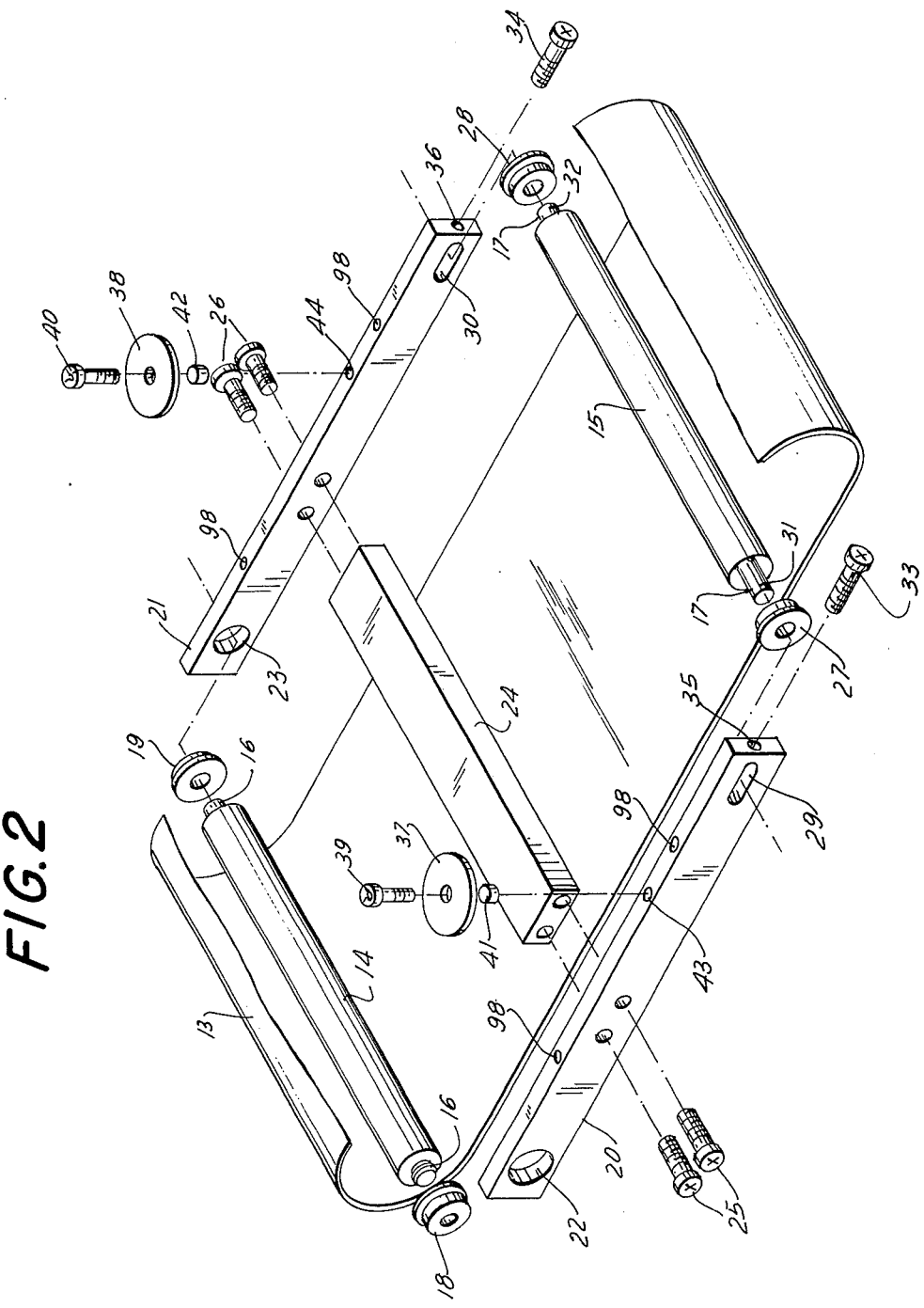
FIG. 2 in the drawings depicts an exploded isometric view of the upper portion of the present decurling device with the upper part of its conveyor belt being cut away to reveal its internal parts.
Figure 3:
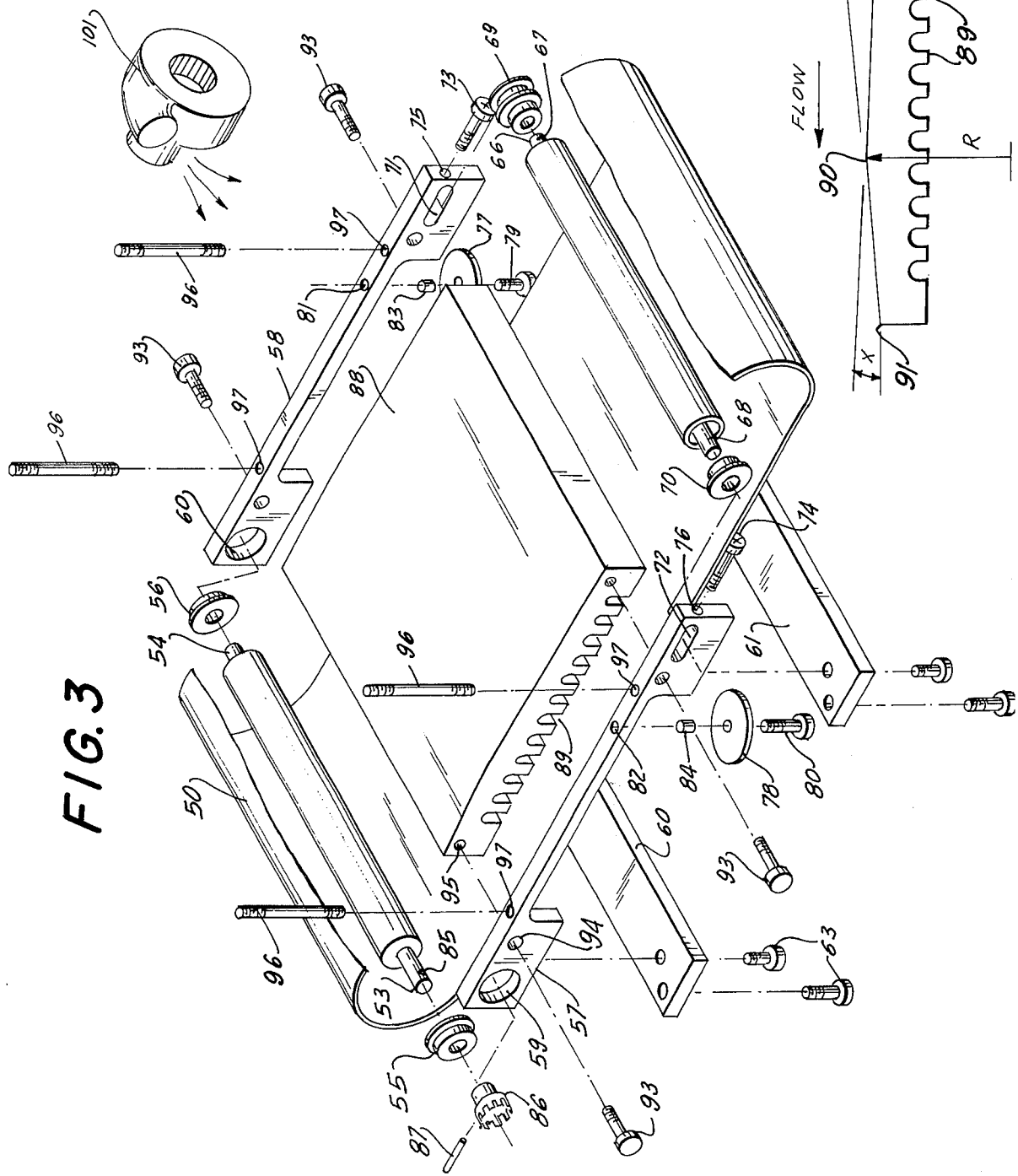
FIG. 3 in the drawings depicts an exploded isometric view of the lower portion of the present decurling device with its conveyor belt cut away to reveal its internal parts and the position of the decurling mandrel.

The roller member 65 is similar to the roller 15 shown in FIG. 2 of the drawings. It likewise comprises a tubular member which is concentrically spaced over the shaft 66 which is provided with the threaded holes 67 and 68 at the end portions thereof. The bushings 69 and 70 are bored to receive the end portions of the shaft 66 which rotates therein, the bushings being provided with an extended portion having a diameter essentially equal to the inside diameter of the roller 65 wherein they bayonet with sufficient interference such that they will not rotate independently of the roller tube 65 and consequently, forms a roller assembly which rotates as a unit around the shaft 66.

The side support plates 57 and 58 are provided with the elongated slots 71 and 72 which are bored to receive the end portions of the shaft 66. The holes 71 and 72 are of a length sufficient to allow lateral movement of the shaft 66 whereby the slack, or conversely, the tension in the flexible belt 50 can be adjusted. This is accomplished by virtue of the adjustment screws 73 and 74 which bayonet through the holes 75 and 76 respectively of the side support plates 58 and 57, and upon being threaded into the respective holes 67 and 68 of the shaft 66, allow a lateral adjustment of the shaft 66, as also further shown in FIG. 1.

The belt 50 is constantly centered on the rollers 52 and 65 by virtue of the idler discs 77 and 78. The disc 77 and 78 are rotatably attached to the respective support plates 58 and 57 by virtue of the screws 79 and 80, the discs being bored to receive the screw members 79 and 80 upon which they rotate. The side support plates 58 and 57 are provided with the threaded bore holes 81 and 82 to receive the bolts 79 and 80. The washers 83 and 84 are provided for maintaining the discs 77 and 78 in a fixed spaced apart relationship relative to the side support plates 58 and 57 and are of a length such that the groove provided in the edge of the disc will lie in essentially the same plane as that of the belt whereby the respective edge of the belt 50 will ride in the groove provided in the peripheral edge of the respective disc. The roller 52 is the drive roller for the present device and its extended shaft portion 53 is provided with the key hole 85 to which the coupling member 86 is attached by virtue of the pin 87. The coupling member 86 is attached to some suitable power means, for example, an electric motor or the like (not shown), for driving the drive roller 52.

Figure 4:
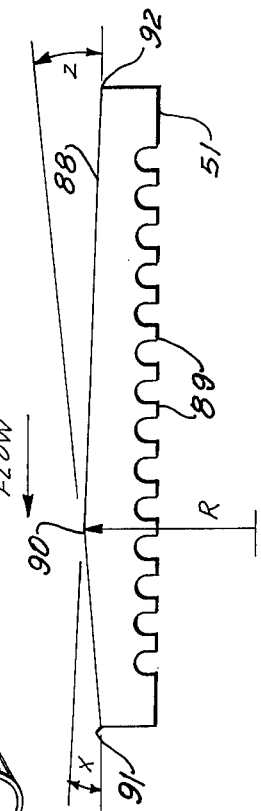
FIG. 4 in the drawings represents an isolated end view of the decurling mandrel shown in FIG. 3.

The mandrel 51, which also serves as a heat sink, is positioned within the interior portion of the chiller belt 50 and is mounted relative to the inside surface of the belt whereby the latter is always in contact with the top surface 88 of the mandrel 51. The mandrel or heat sink 51 is provided with a convex smooth surface so as to minimize friction between the inner surface of the belt 50 and the surface 88 of the mandrel 51. The bottom portion of the mandrel 51 is provided with the finned surface interfacing 89 which provides the primary cooling surface of the heat sink mandrel by virtue of air being flowed over the heat sink fins 89. Referring to FIG. 4 in the drawings which depicts an isolated side view of the mandrel 51, the top surface 88 is illustrated as being convex which is its usual shape since most curling problems are concerned with curvature about an axis perpendicular to the machine direction of the coating on a given photographic film. This is especially true in the case of microfiche due to the small radius of curvature encountered in its manufacture and subsequent storage. Additionally, such film is generally rolled with its emulsion side down such that its measurement of curl will be given a positive value for the reasons discussed above. In light of the preferred application of the present method and means, the shape of the surface 88 of the mandrel 51 will be described with reference thereto. However, it is to be understood where curl occurs in the cross machine direction, then the surface 88 will be convex taken with respect to an apex of curvature which runs parallel to the direction of flow indicated in FIG. 1 of the drawings, rather than perpendicular thereto as illustrated in FIG. 4 and which is illustrative of the preferred application of the present invention. Likewise, where the curl has a negative value, the surface 88 of the mandrel 51 would conversely be concave rather than convex as illustrated in FIG. 1.

Conditioned upon the above, and for ease of manufacture, the surface 88 is made essentially flat over the initial ½ portion, gradually elevating at an angle essentially equivalent to the angle of a chord of the arc prescribed by the radius of curvature of the curled film to be decurled. Thus, the points 92, 90, and 91 would lie upon an arcuate path of equal radius, but opposite in direction as that prescribed by the curl of the particular film to be decurled. As brought out above, the embodiment of FIG. 4 is with reference to positive curl in the machine direction. The angle X would represent the angle of inclination of the first chord and the angle Z will represent the angle of declination of the second chord, the angles X and Z, which are preferably equal to each other being defined relative to a straight line connecting the points 91 and 92. The apex portion 90 of the triangle thus defined would be gradually smoothed over such that a film passing over the surface 88 of the mandrel 51 would make a gradual transition from the inclining to the declining path prescribed by the mandrel. Needless to say, the surface 88 of the mandrel 51, can be accurately machined to match the same arc prescribed by the radius of the curvature of the curled film. However, as brought out above, the design of the surface 88 of the mandrel 51, discussed above, is less expensive to manufacture. Since the only curved portion is that having the large curvature of radius R, as shown in FIG. 4, over the apex 90 of the inscribed triangle lying within the points 90, 91, and 92.

The mandrel or chiller 51 is rigidly mounted within the interior of the belt 50 by virtue of the bolts 93, which bayonet through the boreholes 94 provided in the respective side support plates 57 and 58 and thread into the threaded boreholes 95 provided in the sides of the mandrel 51. In such manner, it is rigidly affixed to and suspended between the side support plates 57 and 53. The mandrel 51 is positioned there between such that the inner surface of the chill belt 50 is always in contact with its surface 88. As brought out above, the extent of contact between these members is also a factor of the amount of tension placed in the belt 50 by virtue of the adjustment of the screws 73 and 74.

The top plate assembly 11 and the bottom plate assembly 12 are operably connected to each other by virtue of the stud bolts 96, which are rigidly attached to the respective side support plates 57 and 58 by virtue of the threaded boreholes 97 provided therein. The side support plates 20 and 21 of the top plate assembly 11 is provided with the boreholes 98, which are spaced apart on center lines corresponding to the postions of the studs 96, the holes 98 being sufficiently large such that the top plate assembly 11 is allowed to move vertically relative to the bottom plate assembly 12. This relative working relationship between the plate assemblies 11 and 12 is maintained by virtue of the resilient spring means 98, which are mounted upon the studs 96 and which are retained thereon by virtue of the retainer washer 99 and nut 100.

The above detailed description of the present decurling device or chill station, as it may be called when employed in a photographic film duplicator, has been described with reference to its preferred application, namely, to remove positive machine direction curl from vesicular microfiche. Hence, the method of the present invention will be described with reference thereto. Referring to FIG. 1 in the drawings, an operator places a heated thermoplastic curled film sample in the nip defined between the belts 13 and 50. Power is supplied to the coupling 86 whereby the roller 52 is rotated in a counter-clockwise direction. This causes the belt 50 to rotate in a counter-clockwise direction, which in turn causes the belt 13 to rotate in a clockwise direction since these members are in frictional contact with each other by virtue of the combined forces of the springs 98. The heated film is thereby pulled inward between the mating surfaces of the belts 13 and 50, where it is then conveyed over the path prescribed by the surface 88 of the mandrel 51. Concurrently, a source of air, for example as supplied by the squirrel-cage electric motor driven fan means 101, flows over the heat sink fins 89 and exits through the opposite side plate assembly. In such manner, the film is decurled by passing over the surface 88 of the mandrel 51 while simultaneously being chilled or cooled thereby fixing the film in its decurled state. The decurled film exits from the present device in a perfect physically flat state.

The materials of construction of the present decurling device are not critical as long as materials possessing the requisite physical properties are employed. Generally, the structural components of the present device are fabricated of aluminium since it is easily machinable. The idler discs are preferably constructed of nylon or some other suitable low coefficient of friction material. The belts are preferably silicone rubber, or the like, capable of standing the necessary tension forces. Additionally, the mandrel or heat sink 51 is preferably aluminium due to its high heat transfer rate. It would be obvious to one skilled in the art that various materials can be employed as well as modifications made in the design of the present decurler device without departing from its true scope and spirit.

I claim:

1. A method of decurling vesicular photographic film comprising:
    a. passing a heated curled vesicular photographic film in a nip defined between two endless belts for conveying the film;
    b. conveying the film over a mandrel having an extended surface of a configuration opposite in shape to that of the curled film;
    c. simultaneously cooling the film while it is in contact with the mandrel; and
    d. thereafter conveying the decurled film away from the mandrel.

2. The method of decurling vesicular photographic film of claim 1 further characterized wherein the vesicular photographic film has a positive curl in the machine direction whereby it is conveyed over a mandrel having an inverted surface opposite to that of the curl of the vesicular film and extending in a machine direction relative to the curled film.

3. The method of decurling vesicular photographic film of claim 2 further characterized in that the positive curled vesicular photographic film is passed over a mandrel having an inverted surface of an angle essentially equivalent to the angle of the cord of the arc prescribed by the radius of curvature of the curled film, the surface of the mandrel extending in the machine direction relative to the film being decurled thereon.

4. The method of decurling vesicular photographic film of claim 3 further characterized in that the vesicular photographic film to be decurled comprises microfiche vesicular photographic film.

5. The method of decurling vesicular photographic film of claim 4 wherein the curled vesicular photographic film comprising a microfiche photographic film which is decurled upon the mandrel has a temperature within the range of about 260° Farenheit to about 140° Farenheit.

6. In a method of producing vesicular film copies of a vesicular master comprising initially positioning the vesicular master in juxtaposition with the vesicular film in an exposure station, exposing the vesicular film and master to a source of high intensity energy, separating the exposed vesicular film and master, conveying the exposed vesicular to a development station for developing the latent image therein, and conveying the developed vesicular film to a clearing station, the improvement comprising:
    decurling the exposed vesicular film after its development by passing the still heated curled vesicular film into a nip defined between two endless belts for conveying the film;
    conveying the film over a mandrel having an extended surface of a configuration opposite in shape to that of the curled film;
    simultaneously cooling the film while it is in contact with the mandrel; and
    thereafter conveying the decurled film away from the mandrel.

7. In a method of producing vesicular microfiche copies of a vesicular microfiche master comprising initially positioning the vesicular microfiche master in juxtaposition with the vesicular microfiche copy in an exposure station, exposing the vesicular microfiche copy and master to a source of high intensity energy, separating the exposed vesicular microfiche copy and master, conveying the exposed vesicular microfiche copy to a development station for developing the latent image therein, and conveying the developed vesicular microfiche copy to a clearing station, the improvement comprising:
    decurling the exposed vesicular microfiche copy after its development by passing the still heated curled vesicular microfiche copy into a nip defined between two endless belts for conveying the copy;
    conveying the copy over a mandrel having an extended surface of a configuration opposite in shape to that of the curled copy; and
    simultaneously cooling the copy while it is in contact with the mandrel, and thereafter conveying the decurled copy away from the mandrel.

8. The method of decurling vesicular microfiche copies of claim 7 further characterized wherein the vesicular microfiche copy has a positive curl in the machine direction whereby it is conveyed over a mandrel having an inverted surface of an angle essentially equivalent to the angle of the cord of the arc prescribed by the radius of curvature of the curled copy, the surface of the mandrel extending in the machine direction relative to the copy being decurled thereon, said vesicular microfiche copy having a temperature within the range of about 260° Farenheit to about 140° Farenheit during its decurling.

* * * * *